United States Patent
Reichel

(10) Patent No.: US 7,819,940 B2
(45) Date of Patent: Oct. 26, 2010

(54) PRODUCTION OF STAINLESS STEEL OF AISI 4XX GRADE FERRITIC STEEL IN AN AOD CONVERTER

(75) Inventor: Johann Reichel, Düsseldorf (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 274 days.

(21) Appl. No.: 11/667,174

(22) PCT Filed: Nov. 11, 2005

(86) PCT No.: PCT/EP2005/012081

§ 371 (c)(1),
(2), (4) Date: Mar. 19, 2008

(87) PCT Pub. No.: WO2006/050963

PCT Pub. Date: May 18, 2006

(65) Prior Publication Data

US 2009/0031860 A1    Feb. 5, 2009

(30) Foreign Application Priority Data

Nov. 12, 2004  (DE) .................. 10 2004 054 871
Jul. 14, 2005   (DE) .................. 10 2005 032 929

(51) Int. Cl.
C21B 5/00   (2006.01)
C21B 13/00  (2006.01)
C21C 1/02   (2006.01)
C21C 5/35   (2006.01)

(52) U.S. Cl. ............... 75/458; 75/382; 75/384; 75/387; 75/552; 75/558; 75/560

(58) Field of Classification Search ........... 75/458, 75/560, 558, 552, 382, 384, 387

See application file for complete search history.

(56) References Cited

U.S. PATENT DOCUMENTS 4,512,802 A   4/1985   Tohge (Continued)

FOREIGN PATENT DOCUMENTS

GB   1430375   3/1976

(Continued)

OTHER PUBLICATIONS

Metal Suppliers Online. "430 Stainless Steel Material Property Data Sheet" copyright 2009, dowloaded Nov. 3, 2009.*

(Continued)

*Primary Examiner*—George Wyszomierski
*Assistant Examiner*—Tima M McGuthry-Banks
(74) *Attorney, Agent, or Firm*—Abelman, Frayne & Schwab

(57) ABSTRACT

For the production of stainless steel of the ferritic AISI 4xx group of steels, particularly the AISI 430 group of steels, based on liquid pig iron and FeCr solids, the invention proposes the use of the AOD (Argon Oxygen Decarburization) process in which oxygen and inert gas (inactive gas) together are blown into the bath through nozzles and top-blown onto the surface of the bath by a blowing lance. The aim of the treatment is to conclude a smelting charge within an optimal time period, to achieve the intended tapping temperature and composition, and to minimize chromium losses. This is achieved by a correspondingly applied technology and by means of a metallurgic process model which observes, prognosticates and controls the treatment of the smelting charge.

8 Claims, 4 Drawing Sheets

U.S. PATENT DOCUMENTS 4,599,107 A * 7/1986 Masterson .................. 75/552

FOREIGN PATENT DOCUMENTS

| GB | 1310573 | 5/2003 |
| JP | 02115314 A * | 4/1990 |
| KR | 2005030353 A * | 3/2005 |

OTHER PUBLICATIONS

Written translation of JP 63-223113 published Sep. 16, 1988 by Masataka Matsuo et al.*
Patent Abstract of Japan No. 57060012, Apr. 1982.
Lemke et al., "Tailored Solution for Production of Quality Steel," Steelmaking XP 009010639, v. 24, No. 4, Aug. 2001.

* cited by examiner

Fig. 2

| Measured event | Treatment step | Technological event | | | | | Control / reference value |
|---|---|---|---|---|---|---|---|
| waste gas analysis and flow measurement | preparation | | | | | | |
| | heating | start/stop injection top blowing lance side nozzles | | | | alloying | tapping |
| | deslagging | | | | | | |
| | refining | principal and dynamic decarburization | start/stop injection top blowing lance side nozzles | end of refinement | | | |
| | reduction / reduction deslagging desulfurizing | | charging reduction material | | charging desulfurizing | alloying materials | end of tapping |
| | | | | | | | |
| | notification | | | | | | |
| | charging lime and dolomite pig iron | end of heating | | | | | |
| | inert gas type flow rate | heating material | alloying materials cooling materials slag-forming materials | reduction material mixing period | desulfurizing materials | alloying materials | |
| | material mixing | blow-in pattern (per step or continuous) - position of top blowing lance - type of gas/flow rate | | top blowing lance and nozzles | | | |

Fig. 3

| | Hot metal weight | 70000 kg | | Basicity: 1.8 | |
|---|---|---|---|---|---|
| T gain (K) | FeSi (kg) | Mass Slag former (kg) | Lime (kg) | Dolomite (kg) | O2 Volume Nm3 |
| 20 | 93 | 260 | 173 | 87 | 54 |
| 40 | 185 | 520 | 346 | 173 | 108 |
| 60 | 278 | 779 | 520 | 260 | 162 |
| 80 | 370 | 1039 | 693 | 346 | 216 |
| 100 | 463 | 1299 | 866 | 433 | 269 |
| 120 | 556 | 1559 | 1039 | 520 | 323 |
| 140 | 648 | 1818 | 1212 | 606 | 377 |
| 160 | 741 | 2078 | 1385 | 693 | 431 |
| 180 | 833 | 2338 | 1559 | 779 | 485 |
| 200 | 926 | 2598 | 1732 | 866 | 539 |
| 220 | 1019 | 2857 | 1905 | 952 | 593 |
| 240 | 1111 | 3117 | 2078 | 1039 | 647 |
| 260 | 1204 | 3377 | 2251 | 1126 | 700 |
| 280 | 1296 | 3637 | 2424 | 1212 | 754 |
| 300 | 1389 | 3896 | 2598 | 1299 | 808 |
| 320 | 1482 | 4156 | 2771 | 1385 | 862 |
| 340 | 1574 | 4416 | 2944 | 1472 | 916 |
| 360 | 1667 | 4676 | 3117 | 1559 | 970 |
| 380 | 1759 | 4935 | 3290 | 1645 | 1024 |
| 400 | 1852 | 5195 | 3463 | 1732 | 1078 |

From the database

Material specification
- price
- chemical composition
- specific energy

Target data for the heating
- steel composition
- temperature
- steel weight

Production practice
- distance of the blowing lance
- injection of oxygen
- inert gas AOD
Process model material calculation From the process Pretreatment data
- steel/slag analysis and composition
- temperature
- steel/slag weight

Fig. 4

Results of Model calculation

Desulfurizing
- lime/fluorite
- synthetic slag
- type and weight of material

Slag formation
- type of material
- weight of material (kg)

Reduction
- type of material
- weight of material (kg)

Alloys/additions
- type of material
- weight of material (kg)

From the database

Material specification
- price
- chemical composition
- specific energy

Target data for the heating
- steel composition
- temperature
- steel weight

Production practice
- injection of oxygen
- inert gas

AOD
Process model energy and mass data

From the process

Pretreatment data
- steel/slag analysis and composition
- temperature
- steel/slag weight Alloys/additions
in charging
- type of material
- weight of material (kg)

Fig. 5

Results of model calculation

Cyclical calculations
- chemical analysis
- steel/slag weight
- decarburizing
- chromium oxidation Calculated reference values
- $O_2$ flow/consumption
- blowing rate of inert gas

PRODUCTION OF STAINLESS STEEL OF AISI 4XX GRADE FERRITIC STEEL IN AN AOD CONVERTER

BACKGROUND OF THE INVENTION

1. Field of the Invention

The invention is directed to a process for the production of stainless steel of the ferritic AISI 4xx group of steels, particularly the AISI 430 group of steels, based on liquid pig iron and FeCr solids.

2. Description of the Prior Art

The use of an AOD converter for producing special steels is already known. For example, WO 02/075003 describes a monitoring method based on a continuous measurement of waste gas in combination with a computer and a dynamic model for controlling the required blow rates for oxygen and inert gas and material additions. EP 1 310 573 A2 discloses a process for the production of a molten metal, particularly for refining a molten metal for the production of, e.g., alloyed stainless steel or special steel in an AOD converter. This process is based on a computational technique which proceeds in accordance with a process model and controls the smelting installation. The process model describes the behavior for at least one variable process parameter between an actual process quantity, a correcting variable and a final process quantity. By way of example, the process sequence for the production of a steel of AISI 304 grade is described.

Conventionally, stainless steels of the ferritic AISI 4xx group of steels are principally produced in EAF from typical scrap and are then alloyed and decarburized in addition in the AOD converter. In order to make use of pig iron for this application, pig iron that has been pretreated in a steel plant is mixed with melted down scrap and alloy in a ladle outside the furnace and is then charged into the converter.

Proceeding from this prior art, it is the object of the invention to make use of the known AOD technology for directly charging pig iron and after-alloy into the converter for the production of stainless steel of the ferritic AISI 4xx group of steels, particularly the AISI 430 group of steels.

SUMMARY OF THE INVENTION

The above-stated object for the production of stainless steel of the above-mentioned grade is met by the characterizing features of claim 1 through the following successively implemented process steps:

producing the liquid pig iron in the blast furnace, DDD treatment of the pig iron, and charging slag-free liquid pig iron into the AOD converter, heating, refining/alloying and reducing the liquid pig iron in the AOD converter, concluding fine-tuning or adaptation/adjustment of the treated molten steel in the smelting station, with the following process features of pig iron treatment in the AOD converter:

heating the pig iron that is supplied to the AOD converter after DDD treatment at an extremely low temperature of only about 1150° C. by Si oxidation using external FeSi addition, alternatively by Al oxidation, adjusting corresponding oxygen blow rates for preventing the slopping of metal from the AOD converter, adjusting the slag basicity at the conclusion of heating before the addition of the alloying agents in order to achieve a suitable slag viscosity for frictionless removal of the slag from the converter, deslagging the melt prior to the decarburization process in order to enable highly efficient top blowing of the $O_2$ blow jet on the melt.

AOD technology, known per se, is used according to the invention in the refining of liquid carbon steel for the production of heat-resistant and acid-resistant types of steel and special steel with a high proportion of chromium. The process is carried out in that oxygen and inert gas (inactive gas) together are blown into the bath through nozzles and, in addition, oxygen and inert gas are top-blown on the surface of the bath by a blowing lance. The aim of the treatment is to conclude a smelting charge within an optimal time period, to achieve the intended tapping temperature and composition, and to minimize chromium losses. The metallurgic process according to the invention enables treatment of a charge in the AOD installation with the process model. The metallurgic process model observes, prognosticates and controls the treatment so that the smelting charge is concluded with the targeted requirements. The applied technology and the process model calculate the reference values for controlling the injected oxygen and the material additions corresponding to the target values of the steel composition and the steel temperature, this calculation being based on the actual process state while taking into account the restrictions and rules defined beforehand by the practical production dates.

Based on a blowing pattern that is defined beforehand by the practical production dates and by means of the oxygen requirement for decarburization and element oxidation, the flow rate and the mixture of the process gas (oxygen and argon/nitrogen) to be blown into the bath through the nozzles arranged below the surface and by a top-blowing lance are controlled and the changeover point from nitrogen to argon is determined for achieving the permissible range of nitrogen in the steel.

Further, the metallurgic process model determines the amount of slag formers, cooling scrap and alloys, the starting point for the addition of alloys, and the charging rate for the addition of alloys.

The production, according to the invention, of stainless steel of the AISI 4xx group of steels, particularly the AISI 430 group of steels, will be described in more detail in the following. AISI 4xx technology with a DDD process line and the AOD converter based on liquid pig iron and FeCr solids is divided into three main steps, namely:

pretreating the liquid pig iron in the blast furnace, heating, refining and alloying the liquid pig iron in the AOD converter, and the concluding adaptation/adjustment in the smelting station.

BRIEF DESCRIPTION OF THE DRAWINGS

The drawings show:

FIG. 2 summary of process data;

FIG. 3 basic components of the metallurgical AOD model;

FIG. 4 essential components o the metallurgical ADO model, material calculation; and FIG. 5 essential components of the metallurgical AOD model, energy and mass data.

DESCRIPTION OF THE PREFERRED EMBODIMENT

Figure 1:
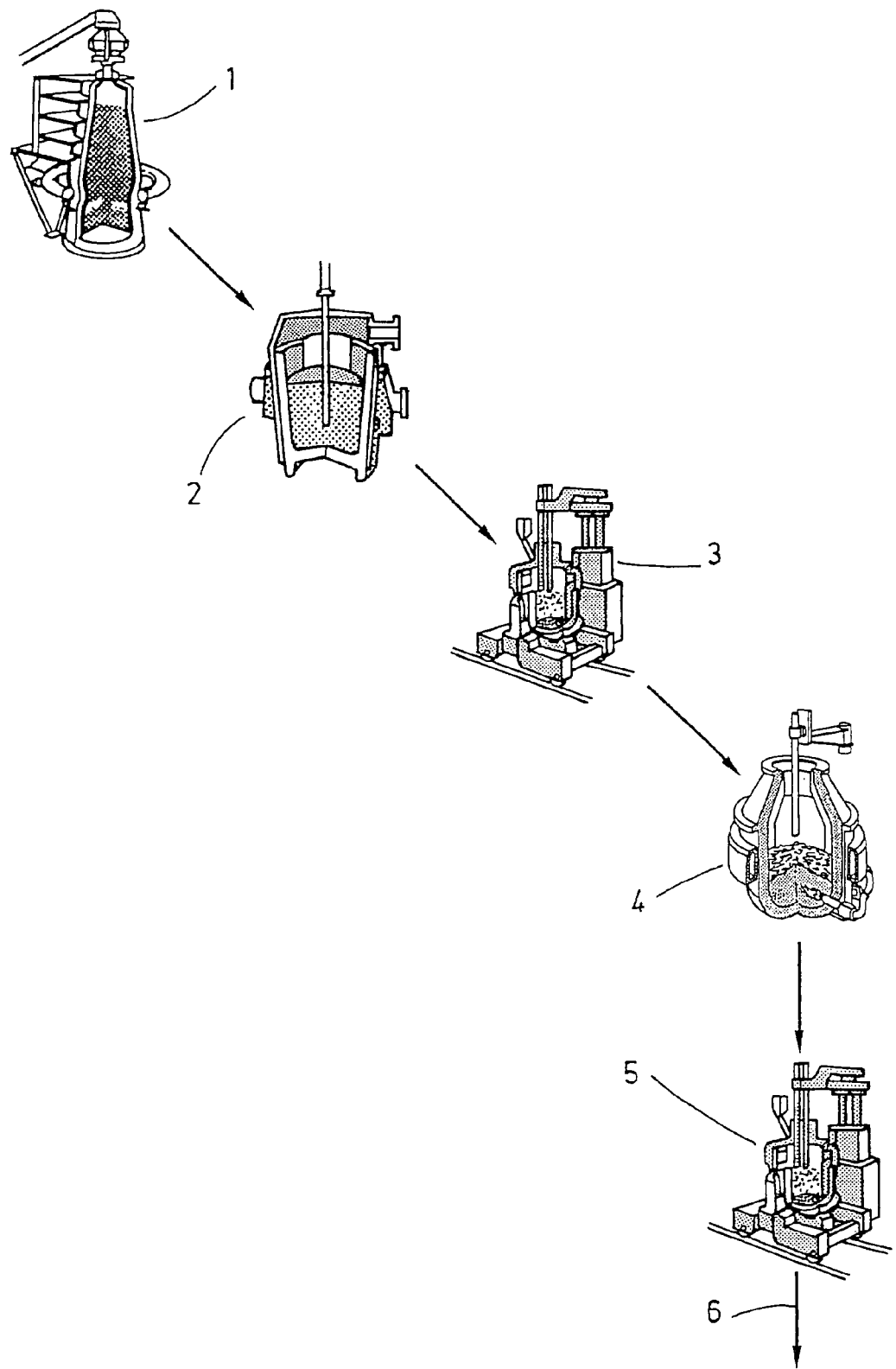
FIG. 1 a process line for production of AISI436 special steel.

FIG. 1 shows, by way of example, a process line for the production of AISI 430 special steel. After exiting from the blast furnace 1, the liquid pig iron first undergoes DDD (Dephosphorizing, Desiliconizing, Desulfurizing) treatment in a correspondingly constructed metallurgic apparatus 2. Subsequently, preheating of the liquid pig iron can be carried out in a ladle furnace 3. The treated, heated melt is then introduced into the AOD converter 4 in which the refining and alloying of the liquid pig iron takes place with the addition of return scrap, cooling scrap and FeCr 60. After treatment in the AOD converter, the molten steel is conveyed to the concluding adaptation/adjustment in the casting ladle 5 and, finally, to the caster 6 (the caster itself is not shown).

Prior to charging with liquid pig iron, slag-forming materials such as lime and dolomite are fed to the AOD converter 4 to ensure the correct base content of the slag. After being charged with slag-free liquid pig iron from the DDD apparatus 2 and ladle furnace 3, the AOD converter 4 is tilted into the sampling position in which the temperature is measured. The AOD converter 4 is then returned to the upright position and, depending on the temperature, undergoes exothermic treatment. The increased temperature is achieved by the addition of FeSi and/or aluminum.

In the following, the process according to the invention is described in relation to a treatment of the molten steel in an AOD converter 4. The process in the AOD converter 4 is divided into three main steps, namely: a) heating the liquid metal, b) refinement, and c) reduction.

FIG. 2 summarizes the sequence of these process steps. In particular, it includes measured events and technical events, the treatment steps that are carried out, the predetermined reference values, and the controlling of the individual partial steps.

The heating of the liquid metal in the AOD converter 4 is generally carried out by means of silicon. The highly exothermal characteristics of this element in reaction with oxygen makes it possible to achieve the target temperature quickly and with high accuracy. The reaction proceeds in the following manner:

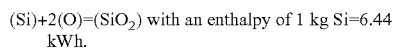

$(Si)+2(O)=(SiO_2)$ with an enthalpy of 1 kg Si=6.44 kWh.

Alternatively, aluminum can also be used as follows:

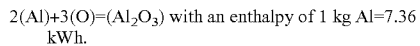

$2(Al)+3(O)=(Al_2O_3)$ with an enthalpy of 1 kg Al=7.36 kWh.

Depending on further additions of alloy-forming materials, the target temperature for heating must depend on the further supply of energy resulting from the decarburization process and metal oxidation process with all of the energy losses brought about during the treatment.

The behavior during this treatment step is similar to that occurring during the first blowing step in the BOF process. The parameters which decide the quality of foaming and the exiting of slag during this step are a high carbon content, the slag formers, the high oxygen injection rate, and the distancing of the blowing lance.

Correct distancing of the blowing lance and the intensity with which oxygen is blown out of the top-blowing lance (blow rate) prevent the exit of slag and ensure an optimal outflow of heat.

The heating circulation is calculated as follows: required energy input=energy input from Si/Al oxidation−(cooling energy of the slag-forming materials+energy losses).

FIG. 3 shows, by way of example, the required heating parameters for pig iron with a charge weight of 70,000 kg and a base content of 1.8 based on the thermal conditions of a converter.

After the process step of heating, the AOD converter 4 is tilted and the metal is deslagged. This procedure is necessary for an efficient refinement of the metal. This is because large amounts of slag weaken the effect of the injected oxygen and the removal of reaction gas from the steel. During the deslagging, the steel temperature is measured and a sample of the metal is taken.

The subsequent refinement of the metal is carried out in that oxygen is blown onto the metal by the top blowing lance, and a mixture of oxygen and inert gas (argon or nitrogen) is blown into the charge through side nozzles. The ratio between the oxygen and the inert gas varies during the blowing process starting with an oxygen-rich mixture.

This process technology ensures that a low carbon proportion is achieved which is advantageous as a starting condition for the subsequent AOD treatment with a minimum of chromium oxidation. Alternatively, the VOD (Vacuum Oxygen Decarburization) process can be used in TRIPLEX technology, as it is called.

During the blowing process, the total quantity of oxygen is constantly divided between the blowing lance located on top and the side nozzles. The refining step is followed by the treatment with slag reduction, wherein, for example, chromium is also recovered from the slag. By adding silicon-containing material such as FeSi or aluminum to the liquid metal accompanied by vigorous agitation, the metal achieves the desired definitive or quasi-chemical composition, but still contains sulfur.

Due to the high sulfur concentrations in the alloying agents and in the slag formers, the treatment of the special steel must be concluded by a separate desulfurization step. The efficiency of this treatment depends substantially on a high deoxidation quality of the liquid metal which is achieved by the addition of aluminum. After the treatment, the charge is tapped into the casting ladle 5 along with a residual quantity of slag.

The steel refining process is planned, monitored, prognosticated and controlled, according to the invention, by a metallurgic AOD model in order to produce the melt or charge in the planned composition and temperature. The substantial advantages offered by the AOD model are:
  the calculation of the charge allows the alloys and scrap to be selected at optimal cost,
  the control of the target temperature,
  a high output is achieved through process control, and reduction materials are minimized.

During the treatment, the actual state of the melt/charge is observed through the available cyclical and event input data which are transmitted through the basic automatic system.

When adding materials, the influence of the material on the weight and on the composition of the steel and slag and on the steel temperature is taken into account with consideration to the material-specific and element-specific active factors. The actual compositions of the steel and slag are compared to the laboratory analyses and laboratory measurements from the time of the sampling while taking into account the additions and losses for each element and each slag constituent.

The essential components of the metallurgic AOD model are the calculation of the target material, the prognostic calculation and the dynamic model calculation.
  In the calculation of the target material, the addition of materials is generally calculated for all possible treatment steps in order to control the steel temperature and steel composition.
  In the prognostic calculation, the treatment strategy of the AOD process is calculated. This encompasses the entire AOD process with the actual state of the charge at the start of treatment and concludes with the tapping. Corresponding to a general treatment time period, the entire treatment of an individual charge with all necessary process steps and sampling is planned with respect to the given practical data.

The dynamic model calculates carbon, oxygen and energy and the reference values for the blow rates of the process gases.

Based on the conditions at the start of smelting, the concentrations of carbon, oxygen and other relevant bath concentrations in the liquid steel and the temperature during the treatment period are calculated.

In FIGS. 4 and 5, the above-mentioned essential components of the metallurgic AOD model are compiled and divided into the main groups of material calculation (FIG. 4) and energy and mass data (FIG. 5). Each of the figures shows which of the data entered into this model come from the database and which come from the process and also which model calculation results are obtained on this basis.

REFERENCE NUMBERS 1 blast furnace
2 DDD apparatus
3 ladle furnace
4 AOD converter
5 casting ladle
6 caster

The invention claimed is:

1. Method of production of stainless steel of ferritic AISI 4xx group of steels, particularly the AISI 430 group of steels, based on liquid pig iron and FeCr solids, wherein a liquid slag-free pig iron, after preliminary treatment in a blast furnace (1) and DDD-treatment, is heated, refined or alloyed, reduced in a ADD-converter and, finally, adaptation/adjustment of a treated molten steel in a casting ladle (5) is carried out,
    characterized in that
    the DDD-treatment of the pit iron is carried out at extremely low temperatures of about 1150° C.,
    in AOD-converter (4) the following method steps heating, refining/alloying, and reduction of the liquid pig iron are carried out by side nozzles and top blowing lance,
    after heating and subsequent deslagging, for refining of the molten metal, oxygen is blown onto the molten metal by the top blowing lance, and a mixture of oxygen and inert gas (argon or nitrogen) is blown into the molten metal through side nozzles, wherein a ratio between the oxygen and the inert gas, starting with an oxygen-rich mixture, varies during the blowing process, and a total quantity of oxygen is constantly divided during a blowing process between the top blowing lance and the side nozzles.

2. Method according to claim 1, characterized in that the necessary energy requirement for heating the pig iron melt is calculated by the following equation: required energy input =energy input from Si/Al oxidation −(cooling energy of the slag-forming materials +energy losses).

3. Method according to claim 1, characterized in that slag reduction is carried out after refining the molten metal with recovery of chromium from the slag and a desired definitive or quasi-chemical composition through addition of silicon-containing material such as FeSi and aluminum.

4. Method according to claim 3, characterized in that a separate desulfurization step is carried out depending upon a desired grade of steel, wherein efficiency of treatment depends substantially on a high deoxidation quality of the liquid metal and is achieved by addition of aluminum.

5. Method according to claim 1, characterized in that the steel refining process in the AOD converter (4) is planned, monitored, prognosticated and controlled by a metallurgic AOD process model in order to achieve a planned composition and temperature.

6. Method according to claim 5, characterized in that the AOD process model makes it possible to calculate a target material and an addition of materials for all possible treatment steps in order to control the steel temperature and steel composition, to carry out a prognostic calculation for calculating a treatment strategy of the AOD process encompassing the entire AOD process with an actual state of the charge at the start of treatment until tapping of the charge, wherein an entire treatment of an individual charge with all necessary process steps and sampling is planned with respect to given practical data corresponding to a general treatment time period, to prepare a dynamic model for calculating data relating to carbon, oxygen and energy and reference values for blow rates of process gases.

7. Method according to claim 6, characterized in that the AOD process model can be used to calculate the charge for selecting alloys and scrap in a cost-optimized manner, to control a target temperature, to carry out a process control with high output, and to minimize reduction materials.

8. Method according to claim 1,
    characterized in that
    based on a blowing pattern that is defined beforehand by practical production data and by oxygen requirement for decarburization and element oxidation, a flow rate and the mixture of the process gas (oxygen and argon/nitrogen) to be blown into the bath through the nozzles arranged below the surface and by a top-blowing lance are controlled, and a changeover point from nitrogen to argon is determined for achieving a permissible range of nitrogen in the steel.

* * * * *